(12) United States Patent
Shiota et al.

(10) Patent No.: US 6,574,376 B1
(45) Date of Patent: Jun. 3, 2003

(54) ARITHMETIC UNIT FOR IMAGE TRANSFORMATION AND MONITORING SYSTEM

(75) Inventors: Fuminori Shiota, Okayama (JP); Tetsuji Matsui, Okayama (JP)

(73) Assignees: Advanet Incorporation, Okayama (JP); RIOS Corporation, Okayama (JP); FIT Corporation, Nagano (JP)

( * ) Notice: Subject to any disclaimer, the term of this patent is extended or adjusted under 35 U.S.C. 154(b) by 0 days.

(21) Appl. No.: 09/409,966

(22) Filed: Sep. 30, 1999

(30) Foreign Application Priority Data

Feb. 12, 1999 (JP) ............................................. 11-034770

(51) Int. Cl.⁷ ................................................. G06K 9/32
(52) U.S. Cl. ....................................... 382/293; 382/285
(58) Field of Search ................................. 382/293, 154, 382/285, 276, 295, 303; 348/580

(56) References Cited

U.S. PATENT DOCUMENTS 5,185,667 A * 2/1993 Zimmermann ............... 358/209
6,392,687 B1 * 5/2000 Driscoll, Jr. et al. .......... 348/36
6,346,967 B1 * 2/2002 Gullichsen et al. ......... 348/207

FOREIGN PATENT DOCUMENTS

| JP | 80-43056 | 2/1996 |
| JP | 10-283469 | 10/1998 |
| WO | WO 92/21208 | 11/1992 |

\* cited by examiner

*Primary Examiner*—Yon J. Couso
(74) *Attorney, Agent, or Firm*—Knobbe Martens Olson & Bear LLP

(57) ABSTRACT

An arithmetic unit for image transformation for transforming a fisheye image obtained by using a fisheye lens into a plane image for display, comprising: a first coordinate calculating unit for obtaining first projection coordinates derived by projecting coordinates on the plane image onto a fisheye image face as an imaginary object face; and a second coordinate calculating unit for obtaining second projection coordinates derived by projecting the first projection coordinates obtained by the first coordinate calculating unit onto the fisheye image face.

8 Claims, 4 Drawing Sheets

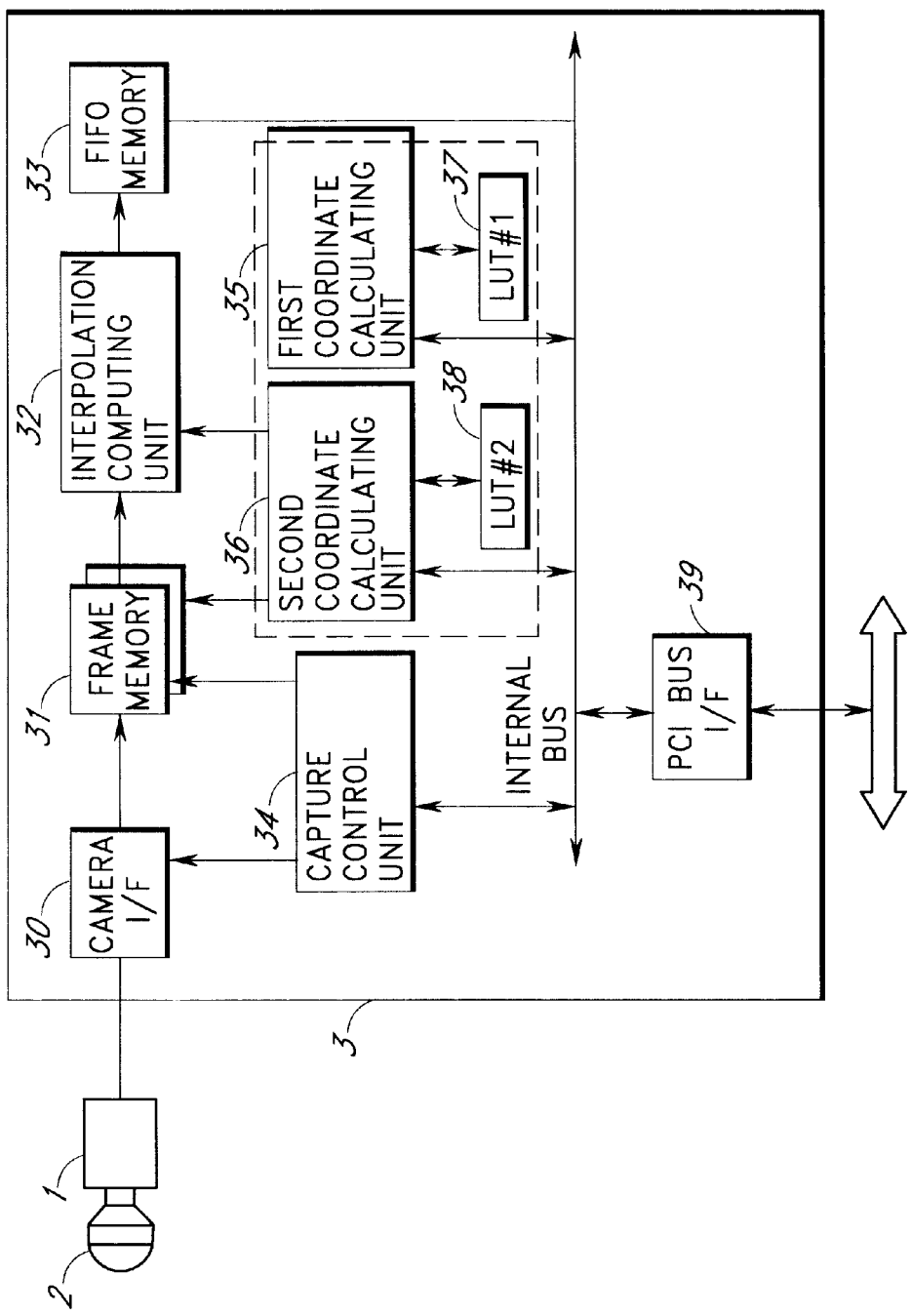

ARITHMETIC UNIT FOR IMAGE TRANSFORMATION AND MONITORING SYSTEM

BACKGROUND OF THE INVENTION

1. Field of the Invention

The present invention relates to an arithmetic unit for image transformation and a monitoring system. More particularly, the invention relates to an arithmetic unit for image transformation for transforming an image obtained by using a fisheye lens into a plane image for display and a monitoring system having the arithmetic unit.

2. Description of the Related Art

An arithmetic unit for image transformation is used in, for example, a monitoring system using a monitoring camera. The operator monitors the state in a space (for example, shop) in which the monitoring camera is installed, by watching images from the monitoring camera displayed on a monitor provided for the monitoring system. When a lens attached to the camera is an ordinary standard lens, the space can be monitored only within the range of the angle of view of the standard lens. In order to monitor the entire space in which the camera is installed, it is necessary to provide a mechanism for properly changing the orientation of the camera. In case of providing such a mechanism, the cost increases and the camera has to be remote controlled. It consequently becomes hard for the operator to handle it.

There is an idea such that a fisheye lens having the wide angle of view is attached to the camera and monitoring is performed by using the fisheye lens. An image produced by the fisheye lens is, however, distorted as compared with an image obtained by using the standard lens and is very hard for the operator to watch it. A technique for transforming an image produced by the fisheye lens into a plane image is disclosed as a camera orientation system in WO92/21208.

The system transforms a circular image obtained by using the fisheye lens into an image produced by a normal image pickup lens (for example, standard lens) by an arithmetic process and a plane image seen from an arbitrary view point can be obtained. In this case, when a high speed arithmetic unit is used, plane image data can be obtained at real time rates only by software. In most of the cases, it takes long time for a communicating process, operation as a human interface, and the like in a terminal device connected to a network. It is therefore preferable to realize a part in which the same process is repeated in an image transforming process, by hardware.

Since the projecting method (stereoscopic projection, equidistant projection, orthogonal projection, or the like) of projecting a fisheye lens image onto an image pickup device (such as CCD) provided for the camera is determined at the time of designing, by executing arithmetic computations according to mathematical expressions by hardware, the image can be transformed to a plane image.

As disclosed in WO92/21208, however, when calculations upon transformation are expressed by mathematical equations and executed according to the mathematical equations by hardware, it is necessary to realize many calculations of not only addition, subtraction, multiplication, and division, but also square root, trigonometric function, and the like by the hardware. The unit consequently cannot help becoming expensive inevitably.

The invention has been achieved in consideration of the actual condition of the conventional technique and it is an object of the invention to provide an arithmetic unit for image transformation capable of providing inexpensive hardware for transforming a fisheye image obtained by using a fisheye lens into a plane image for display.

SUMMARY OF THE INVENTION

In order to achieve the object, an arithmetic unit for image transformation according to the invention, for transforming a fisheye image obtained by using a fisheye lens into a plane image for display, comprises:

a first coordinate calculating unit for obtaining first projection coordinates on a fisheye image face as an imaginary object face derived by projecting coordinates on the plane image; and a second coordinate calculating unit for obtaining second projection coordinates derived by projecting the first projection coordinates obtained by the first coordinate calculating unit onto the fisheye image face.

The action of the configuration is as follows:

Step 1. The first projection coordinates on the fisheye image face as an imaginary object face obtained by projecting coordinates on the plane image are derived by the first coordinate calculating unit; and Step 2. The second projection coordinates obtained by projecting the first coordinates onto the fisheye image face are derived.

That is, when an image is transformed, the coordinate calculations are not performed by mathematical equations at once but are executed by stages. Consequently, the calculating unit can be constructed by combining simple arithmetic circuits and the hardware part in the arithmetic unit for image transformation can be realized at low cost.

As a preferred embodiment of the invention, a logic circuit for arithmetic operation has a pipelined architecture in each of the first and second coordinate calculating units.

By making the logic circuit have the pipelined architecture, the coordinate transformation can be sequentially performed by stages and the circuit configuration can be partially simplified. As a result, the hardware part in the arithmetic unit for image transformation can be realized at low cost.

As another preferred embodiment of the invention, the logic circuit for arithmetic operation is limited to calculations of addition, subtraction, multiplication, and square root, and division and other function calculations are handled by referring to a lookup table.

In case of executing the calculations according to the equations by the hardware, it is necessary to realize many arithmetic operations such as addition, subtraction, multiplication, and division, and in addition, square root, trigonometric function, and the like by hardware. It is consequently necessary to use a large-scale circuit part. Especially, depending on the projecting method of the fisheye lens, there may be a case such that approximation occurs by trigonometric function or infinite polynomial. The logic circuit for arithmetic operation is consequently limited to addition, subtraction, multiplication, and square root. With respect to a part expressed by division or other function, a lookup table is referred to. Consequently, the hardware can be simplified and it can contribute to reduce the cost of the arithmetic unit for image transformation.

According to further another preferred embodiment of the invention, the second coordinate calculating unit is used to obtain the second projection coordinates by multiplying the first projection coordinates by a predetermined coefficient and the predetermined coefficient is obtained from the lookup table.

When the projecting method of the fisheye lens differs, the coefficient becomes different. Only by changing data in the lookup table, the invention can deal with a different projecting method and it is unnecessary to replace the hardware part. The cost of the hardware part in the arithmetic unit for image transformation can be therefore reduced also with respect to the point.

A monitoring system according to the invention is characterized by comprising the arithmetic unit for image transformation. According to the arithmetic unit for image transformation, the arithmetic unit can be constructed by combining simple arithmetic circuits and the cost of the hardware part in the arithmetic unit for image transformation can be reduced, so that an inexpensive monitoring system can be provided.

BRIEF DESCRIPTION OF THE DRAWINGS

FIG. 4 is a block diagram of circuits mounted on a PCI bus substrate.

DETAILED DESCRIPTION OF THE PREFERRED EMBODIMENTS

A preferred embodiment of an arithmetic unit for image transformation according to the invention will be described in detail with reference to the drawings.

<Positional Relation of Coordinate System>

Figure 1:
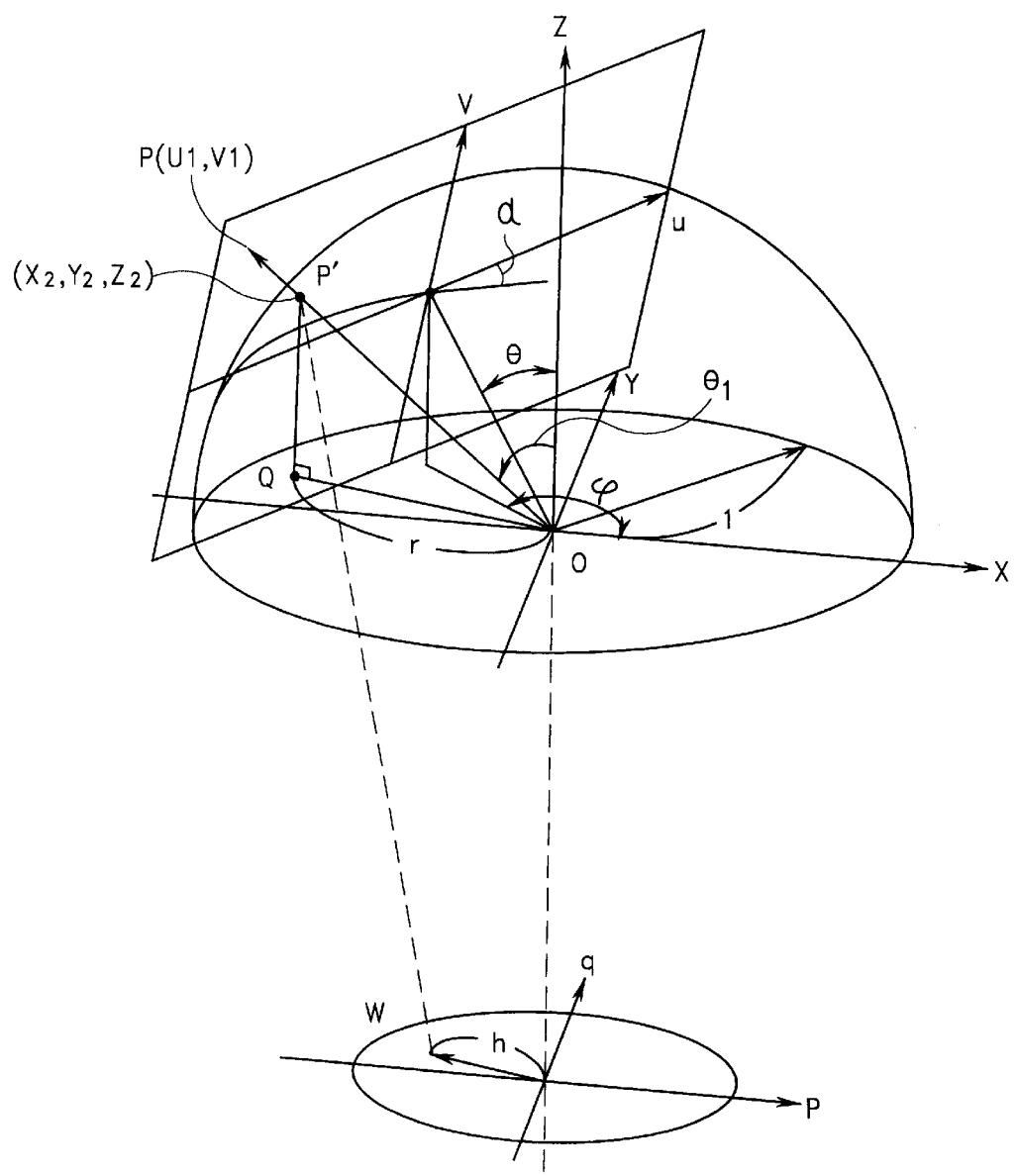
FIG. 1 is a diagram showing setting of a coordinate system.

Referring to FIG. 1, the positional relation of coordinates to be transformed will be described. The coordinate system will be set as follows. As a space for showing the position of an object, an (X, Y, Z) coordinate space in which the position of a fisheye lens is the origin and the direction of the optical axis is the Z axis is set. The azimuth ($\psi$) and the zenithal angle ($\theta$) are set as parameters indicating the position of the object seen from the origin.

Since the position on an image pickup device (such as CCD), of an object whose image is obtained through the fisheye lens is determined at an angle seen through the fisheye lens, it is assumed that the object is positioned on the surface of a hemisphere of radius of 1. The hemispherical face is called an imaginary object face.

A plane image to be obtained is shown by an (u, v) coordinate system in FIG. 1. It is assumed that the center (origin) of the (u, v) coordinate system is in the position apart from the origin of the (X Y, Z) coordinate system by distance 1 and is in contact with the hemispherical face as the imaginary object face. The plane expressed by the (u, v) coordinate system is made correspond to pixels of a display image on a monitor. The angle between the u axis of the coordinate system and the (X, Y) plane, that is, the angle formed by an intersecting line of a plane which passes the origin of the (u, v) coordinate system and is in parallel with the (X, Y) plane and the (u, v) plane and the u axis is set as ($\alpha$).

A plane image (fisheye image) obtained through the fisheye lens is expressed by a (p, q) coordinate system as shown in FIG. 1. It is assumed that the (p, q) coordinate system is parallel to the (X, Y) plane and has the origin on the Z axis. In a position on an image pickup face (for example, position of a pixel on a CCD image pickup device), the image circle diameter differs according to the size of the image pickup device and the focal distance of the fisheye lens. Consequently, it is assumed that a fisheye image is projected in a circle of radius 1 of an image of an object positioning at 90 degrees (Z=0) from the front of the lens. At the time of actually use, magnification adjustment is performed.

An image is transformed as follows. The projecting position on the image pickup face (p, q coordinates) of a point (u, v coordinates) on a plane image is obtained by arithmetic operation. By referring to luminance information at the point, data of the plane image to be obtained can be generated. Information of the view points ($\psi$, $\theta$, $\alpha$) and the scale factor (zoom ratio) as the size of the plane image is information inputted by the operator through a keyboard, pointing device, or the like and is obtained and set in advance as data for calculation by a higher-order arithmetic processing unit.

Figure 2:
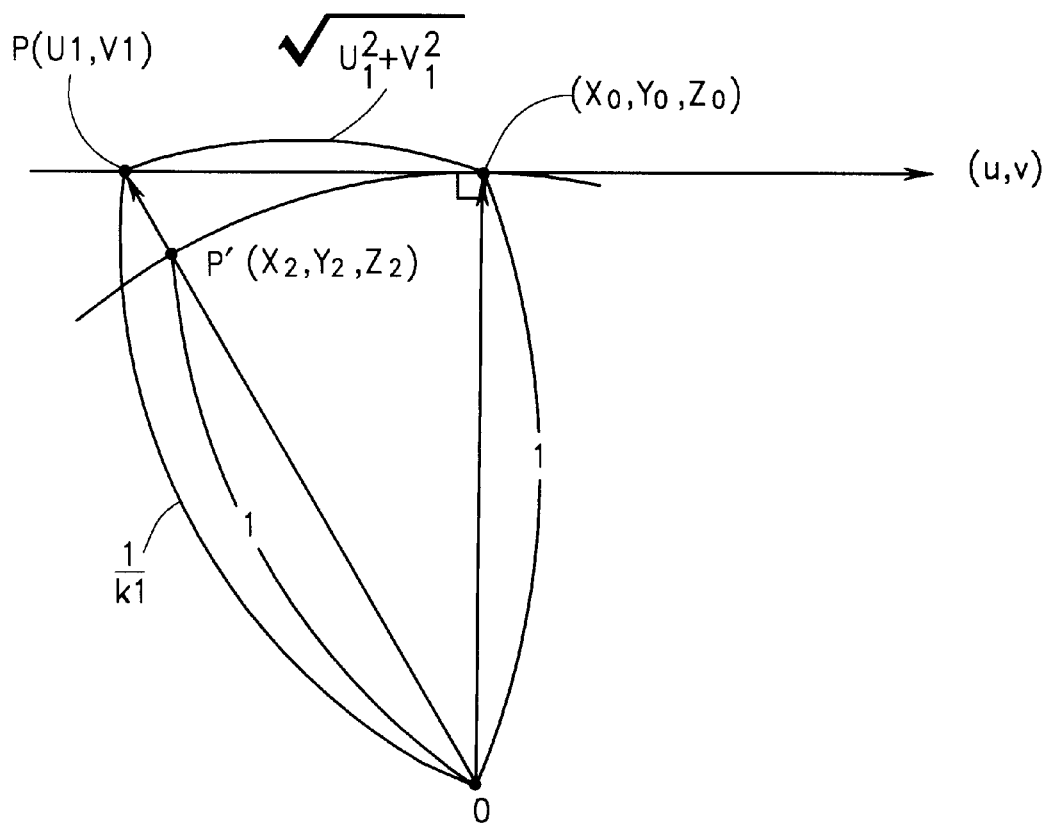
FIG. 2 is a diagram for explaining a correction coefficient $k_1$.

Necessary parameters are, as shown in FIGS. 1 and 2, ($X_0$, $Y_0$, $Z_0$) indicative of the center (origin) of a plane image and change amounts $\partial ux$, $\partial vx$, $\partial uy$, $\partial vy$, $\partial uz$, $\partial vz$ in the respective axes of the (X, Y, Z) coordinates when a point is moved in the respective directions on the (u, v) coordinate system by an amount of one pixel (corresponding to one pixel on the monitor screen).

The parameters can be easily obtained from the information of the angle information ($\psi$, $\theta$, $\alpha$) of the view point and the magnification of the image.

<Calculating Procedure for Image Transformation>

A calculating procedure for image transformation will now be described with reference to FIG. 3. The calculating procedure is performed by, broadly, two steps of first and second steps.

Step 1

First, the coordinates of a point P' (first projection coordinates) on the hemispherical face as an imaginary object face, which is a projection of a point P on a plane image (the u, v coordinates) are obtained.

When it is assumed that the (X, Y, Z) coordinates of the point P are ($X_1$, $Y_1$, $Z_1$) and the (u, v) coordinates are ($u_1$, $v_1$), the following are given.

$$X_1 = X_0 + u_1 \cdot \partial ux + v_1 \cdot \partial vx$$

$$Y_1 = Y_0 + u_1 \cdot \partial uy + v_1 \cdot \partial vy$$

$$Z_1 = Z_0 + u_1 \cdot \partial uz + v_1 \cdot \partial vz$$

As clearly shown in FIG. 2, the point P' is on the line connecting O and P. When a coefficient is set to $k_1$, the following relation is satisfied.

$$(X_2, Y_2, Z_2) = k_1 \cdot (X_1, Y_1, Z_1)$$

The distance between the origin of the (X, Y, Z) coordinate system and the point P' expressed by the coordinates ($X_2$, $Y_2$, $Z_2$) is 1. The distance between the origin ($X_0$, $Y_0$, $Z_0$) of the (u, v) coordinate system and the point P' expressed by the coordinates ($X_2$, $Y_2$, $Z_2$) is 1. The distance L from the origin of the (u, v) coordinate system to the point P is obtained as follows.

$$L = (u^2 + v^2)^{0.5}$$

When the distance L is determined, $k_1$ is constant. Consequently, a table of $k_1$ with respect to the distance L is formed as a lookup table and multiplication by $k_1$ obtained from the lookup table is executed, thereby enabling ($X_2$, $Y_2$, $Z_2$) to be obtained as follows (refer to FIG. 3).

$$X_2 = k_1 \cdot X_1$$

$Y_2 = k_1 \cdot Y_1$ $Z_2 = k_1 \cdot Z_1$

In this manner, the first projection coordinates on the hemispherical face are determined.

Step 2

As a second step of the calculation, a procedure of obtaining second projection coordinates $w(p_1, q_1,)$ on a fisheye image face from the first projection coordinates $(X_2, Y_2, Z_2)$ determined (refer to FIG. 1 with respect to w) will be explained.

As described above, since the point P' is on the surface of the hemisphere of radius of 1, the zenithal angle $(\theta_1)$ is unconditionally determined from the value of $Z_2$ (refer to FIG. 1 with respect to $\theta_1$). The following equation (1) is therefore derived.

$$\theta_1 = \cos^{-1}(Z_2) \quad (1)$$

Since the azimuth of the point w on the image pickup face and that of the point P' on the hemispherical face are the same, the following equation (2) is satisfied.

$$(p_1, q_1) = k_2 \cdot (X_2, Y_2) \quad (2)$$

Since the height (h) from the origin on the fisheye image face (origin of the p, q coordinate system) to the point w is expressed as a function of $\theta_1$ according to the fisheye image projecting method, the following equation (3) is satisfied.

$$h = F(\theta_1) \quad (3)$$

Some examples of specific functions of $F(\theta_1)$ according to the projecting method will be shown. When it is assumed that the focal distance of the fisheye lens is f, the following relations are established.

equidistant projection: $h = f \cdot \theta$ stereoscopic projection: $h = 2f \cdot \tan(\theta/2)$ When the equation (1) is substituted for the equation (3), the following equation (4) is given h can be expressed as a function determined by $Z_2$.

$$h = F(\cos^{-1}(Z_2)) \quad (4)$$

With respect to the distance r from the origin of the (X, Y, Z) coordinate system to the point Q obtained by projecting the point P' onto the (X, Y) plane, since the point P' is a point on the surface of the hemisphere of radius of 1, the following equation (5) is satisfied.

$$r = (1 - Z_2^2)^{0.5} \quad (5)$$

The following equation (6) is therefore given from the equations (4) and (5).

$$k_2 = h/r \quad (6)$$
$$= F(\cos^{-1}(Z_2))/(1 - Z_2^2)^{0.5}$$

That is, the coefficient $k_2$ of the equation (2) can be derived as a function of $Z_2$. With respect to the coefficient $k_2$, a lookup table for obtaining the coefficient $k_2$ from the value of $Z_2$ in accordance with the equation (3) is generated. By using the value, second projection coordinates $(p_1, q_1)$ on the image pickup face are obtained as follows.

$p_1 = k_2 \cdot X_2$ $q_1 = k_2 \cdot Y_2$

As described above, in the first step for image transformation, calculation is limited to addition, subtraction, multiplication, and square root, and the other functions are obtained from the lookup table. The calculation in the second step is limited to multiplication and the other calculation of functions and the like is handled by referring to the lookup table. By executing the calculations in accordance with the steps, a simple arithmetic circuit (logic circuit such as an adder) can have a pipelined architecture. The circuit scale of the part of the complicated function calculation is suppressed by using the lookup table. Further, by changing the table for obtaining $k_2$ in the second step, a fisheye lens of a different projecting method can be dealt with easily, moreover, by the same arithmetic circuit.

<Example of Circuit Configuration>

A specific circuit block configuration will now be described with reference to FIG. 4. The configuration relates to an example of a substrate which is configured for a computer system having a PCI (Peripheral Component Interconnect) bus.

A fisheye lens 2 is attached to a CCD camera 1 and image information obtained by the CCD camera 1 is sent to a PCI bus substrate 3 and subjected to processes for image transformation. The PCI bus substrate 3 comprises: a camera interface 30 for obtaining fisheye image data from a CCD provided for the CCD camera 1; a frame memory 31 for storing fisheye image data of one frame; an interpolation computing unit 32 for executing an interpolating computation on the basis of the calculation result of an operation part 40; an FIFO memory 33; a capture control unit 34 for controlling capture of the fisheye image data to the frame memory 31; the operation part 40 (part surrounded by a broken line) having the configuration which characterizes the invention; and a PCI bus interface 39 for sending plane image data obtained by the coordinate transformation.

The operation part 40 comprises a first coordinate calculating unit 35, a second coordinate calculating unit 36, a first lookup table 37 connected to the first coordinate calculating unit 35, and a second lookup table 38 connected to the second coordinate calculating unit 36. Further description will be given in relation to the coordinate transforming procedure. The first coordinate calculating unit 35 is a part of executing the calculation of the first step shown in FIG. 3 and can obtain the first projection coordinates $(X_2, Y_2, Z_2)$ on the hemispherical face from the (u, v) coordinates in the plane image. The first lookup table 37 is a table for obtaining the correction coefficient $k_1$ from the distance L.

Figure 3:
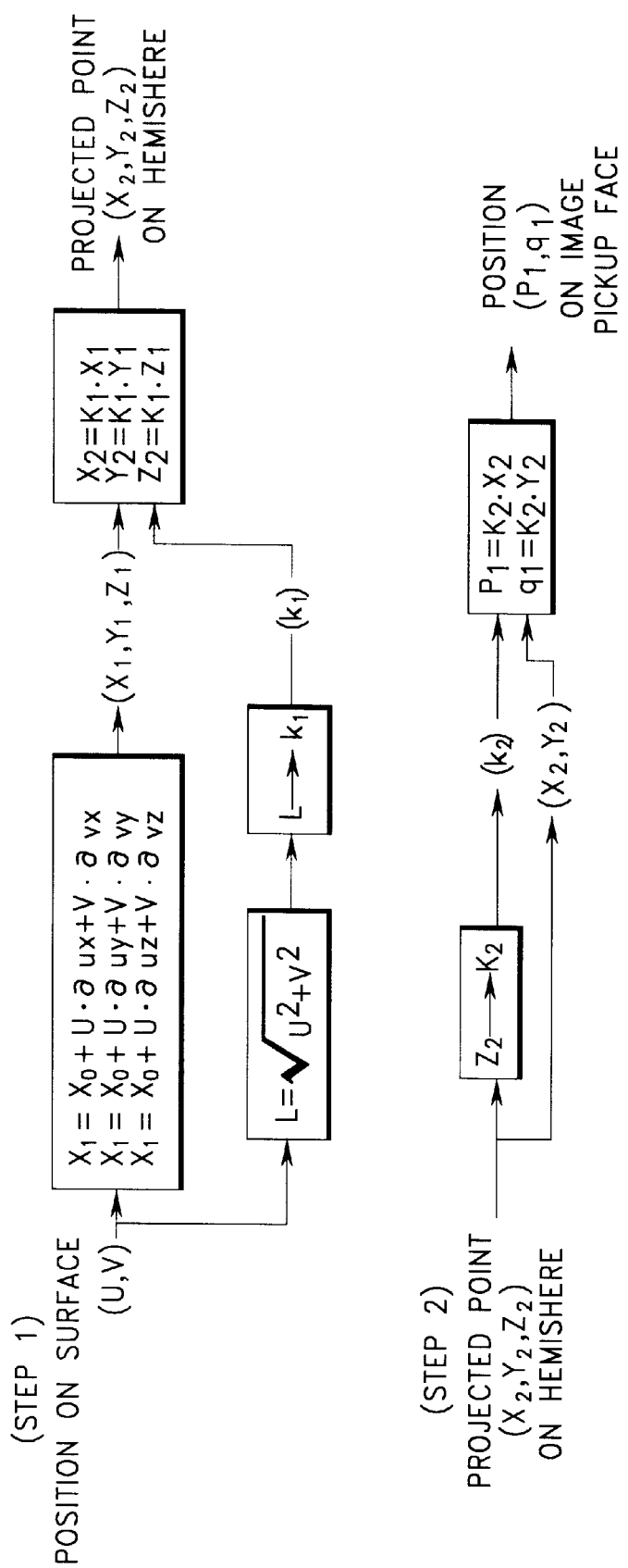
FIG. 3 is a diagram for explaining a procedure of transforming coordinates by hardware.

The second coordinate calculating unit 36 is a part of executing the calculation of the second step in FIG. 3 and can obtain the second projection coordinates $(p_1, q_1)$ on the fisheye image face from the first projection coordinates $(X_2, Y_2, Z_2)$ derived by the first coordinate calculating unit 35. The second lookup table 38 is a table for obtaining the correction coefficient $k_2$.

<Description of Circuit Operation>

The operation of the circuit shown in FIG. 4 will now be described.

Fisheye image data obtained by the CCD camera 1 is written into the frame memory 31 via the camera interface 30. Since the coordinates (p, q) on the image pickup face corresponding to the coordinates (u, v) on the display screen are obtained in the operation part 40, image data corresponding to the coordinates (p, q) sequentially designated by the operation part 40 is read from the frame memory 31 and is sent to the interpolation computing unit 32.

Strictly, the position of a pixel on the fisheye image does not coincide with a pixel on the plane image to be displayed on the monitor. Plural data of pixels nearby is consequently read from the frame memory 31 and interpolation is performed by obtaining a weighted mean of the data, thereby enabling a natural plane image to be obtained.

The interpolated image data is subjected to speed adjustment by the FIFO memory and resultant data is transferred to a memory on the host computer side via the PCI bus interface 39. In case of the example of the configuration of FIG. 4, since the processes such as coordinate calculation and interpolating calculation can be executed by a middle-scale FPGA (or gate array), the hardware can be constructed relatively cheap.

What is claimed is:

1. An arithmetic unit for image transformation for transforming a fisheye image on a fisheye image face obtained by using a fisheye lens into a plane image for display on a plane image face, comprising:

a first coordinate calculating unit for obtaining first projection coordinates on an imaginary hemispheric face from coordinates on the plane image face, wherein the first projection coordinates are derived by projecting the coordinates on the plane image face onto the imaginary hemispheric face, said first coordinate calculating unit outputting the first projection coordinates; and a second coordinate calculating unit for receiving the first projection coordinates and obtaining therefrom second projection coordinates on the fisheye image face, wherein the second projection coordinates are derived by projecting the first projection coordinates onto the fisheye image face.

2. An arithmetic unit for image transformation according to claim 1, wherein a logic circuit for arithmetic operation has a pipelined architecture in each of the first and second coordinate calculating units.

3. An arithmetic unit for image transformation according to claim 2, wherein the logic circuit for arithmetic operation is limited to calculations of addition, subtraction, multiplication, and square root, and division and other function calculations are handled by referring to a lookup table.

4. An arithmetic unit for image transformation according to claim 3, wherein the second coordinate calculating unit is used to obtain the second projection coordinates by multiplying the first projection coordinates by a predetermined coefficient and the predetermined coefficient is obtained from the lookup table.

5. A monitoring system comprising:

a CCD camera to which a fisheye lens is attached and a PCI bus substrate having an arithmetic unit for image transformation for transforming a fisheye image obtained by using the fisheye lens into a plane image for display, wherein the arithmetic unit for image transformation comprises:

a first coordinate calculating unit for obtaining first projection coordinates on an imaginary hemispheric face from coordinates on the plane image face, wherein the first projection coordinates are derived by projecting the coordinates on the plane image face onto the imaginary hemispheric face, said first coordinate calculating unit outputting the first projection coordinates; and a second coordinate calculating unit for receiving the first projection coordinates and obtaining therefrom second projection coordinates on the fisheye image face, wherein the second projection coordinates are derived by projecting the first projection coordinates onto the fisheye image face.

6. A monitoring system according to claim 5, wherein a logic circuit for arithmetic operation has a pipelined architecture in each of the first and second coordinate calculating units.

7. A monitoring system according to claim 6, wherein the logic circuit for arithmetic operation is limited to calculations of addition, subtraction, multiplication, and square root, and division and other function calculations are performed by referring to a lookup table.

8. A monitoring system according to claim 7, wherein the second coordinate calculating unit is used to obtain the second projection coordinates by multiplying the first projection coordinates by a predetermined coefficient and the predetermined coefficient is obtained from the lookup table.

* * * * *